US010152543B1

(12) United States Patent
Galfi et al.

(10) Patent No.: US 10,152,543 B1
(45) Date of Patent: Dec. 11, 2018

(54) GENERATING CONTENT LABELS ACCORDING TO USER SEARCH QUERIES

(71) Applicant: Google LLC, Mountain View, CA (US)

(72) Inventors: Rudolf Michael Galfi, Palo Alto, CA (US); Stephen Paul Farrell, San Francisco, CA (US); Lucian Florin Cionca, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 480 days.

(21) Appl. No.: 14/728,947

(22) Filed: Jun. 2, 2015

Related U.S. Application Data

(60) Provisional application No. 62/007,323, filed on Jun. 3, 2014.

(51) Int. Cl.
*G06F 17/30* (2006.01)

(52) U.S. Cl.
CPC .... *G06F 17/30867* (2013.01); *G06F 17/3053* (2013.01); *G06F 17/30684* (2013.01)

(58) Field of Classification Search
CPC ......... G06F 17/30867; G06F 17/30684; G06F 17/3053
See application file for complete search history.

(56) References Cited

U.S. PATENT DOCUMENTS

| | | | | |
|---|---|---|---|---|
| 8,849,812 | B1 * | 9/2014 | Mukherjee | G06F 17/30867 707/728 |
| 2009/0063447 | A1 * | 3/2009 | Bailey, Jr. | G06F 17/30672 |
| 2013/0085745 | A1 * | 4/2013 | Koister | G06F 17/2785 704/9 |
| 2014/0358885 | A1 * | 12/2014 | Zhou | G06F 17/30873 707/708 |
| 2014/0365302 | A1 * | 12/2014 | Walker | G06T 11/206 705/14.53 |

* cited by examiner

*Primary Examiner* — Robert W Beausoliel, Jr.
(74) *Attorney, Agent, or Firm* — Dority & Manning, P.A.

(57) ABSTRACT

In one aspect, a method includes retrieving terms associated with a topic and analyzing the terms based on search results of user queries for content relating to the topic. The method includes selecting one or more terms from the terms based on the analysis. The method includes generating a label from the selected one or more terms and applying the label to a content item relating to the topic. Other aspects can be embodied in corresponding systems and apparatus, including computer program products.

17 Claims, 4 Drawing Sheets

200

201 Retrieve a set of search term or phrases associated with a content item set relating to a topic 202 Analyze the search term or phrases 203 Select one or more search terms or phrases based on the analysis 204 Generate a label from the selected one or more search terms or phrases 205 Apply the label to one or more content items of the content item set

GENERATING CONTENT LABELS ACCORDING TO USER SEARCH QUERIES

CROSS-REFERENCE TO RELATED APPLICATION

The present application claims the benefit of U.S. Provisional Patent Application Ser. No. 62/007,323, entitled "Generating Content Labels According To User Search Queries," filed on Jun. 3, 2014, which is hereby incorporated by reference in its entirety for all purposes.

BACKGROUND

When providing content items to users, it may be beneficial to categorize and/or group content items. To do so, a label may provide the user with information regarding the category or grouping of the content items. These labels can provide the user with information about the content in a summarized manner.

SUMMARY

The disclosed subject matter relates to a machine-implemented method. The method may include retrieving terms associated with a topic and analyzing the terms based on search results of user queries for content relating to the topic. The method may include selecting one or more terms from the terms based on the analysis. The method may include generating a label from the selected one or more terms and applying the label to a content item relating to the topic. Other aspects can be embodied in corresponding systems and apparatus, including computer program products.

These and other aspects can include one or more of the following features. The plurality of search terms or phrases may be associated with content items of the set of content items based on user queries for content relating to the topic. Search terms or phrases of the plurality of search terms or phrases may be associated with content items of the set of content items by identifying one or more queries for content relating to the topic, each of the one or more queries including one or more search terms or phrases, for each of the one or more queries determining a set of search results provided in response to the query, wherein each search result corresponds to at least one content item, receiving an indication of selection of one or more of the search results corresponding to one or more content items, wherein the selection of a search result provides access to the content item corresponding to the search result and associating the search terms or phrases associated with the query with the one or more content items corresponding the selected one or more search results.

Analyzing the search terms or phrases may include ranking the search terms or phrases according to the one or more criteria, and wherein the selecting the one or more search terms or phrases is based on the ranking. The one or more criteria may include a frequency of use of the search term or phrase with respect to content items belonging to the content items set. The one or more criteria may include relevancy of the search term or phrase to the topic.

Selecting one or more search terms or phrases may be according to rules for generating a label. The label may include a title applied to a collection of content items relating to the topic. The label may include a hashtag applied to one or more content items relating to the topic.

The method may further include providing the label for display along with the one or more content items relating to the topic.

The disclosed subject matter also relates to a system including one or more processors and a machine-readable medium including instructions stored therein, which when executed by the processors, cause the processors to perform operations. The operations may include retrieving terms associated with a topic and analyzing the terms based on a number of content items viewed as search results of user queries including the terms. The operations may include selecting one or more terms from the terms based on the analysis. The operations may include generating a label from the selected one or more terms and applying the label to a content item relating to the topic. Other aspects can be embodied in corresponding systems and apparatus, including computer program products.

These and other aspects can include one or more of the following features. Search terms or phrases may be associated with content items based on user queries, and wherein a content item is associated with search terms or phrases by identifying one or more queries for content, each of the one or more queries including one or more search terms or phrases and for each of the one or more queries determining a set of search results provided in response to the query, wherein each search result corresponds to at least one content item, receiving an indication of selection of one or more of the search results providing access to the content item and associating the search terms or phrases associated with the query with the content item.

Identifying the search terms or phrases may include identifying search terms or phrases associated with each content item of the content item set. The topic may include a news story or event. The content item set may include a news collection including a plurality of news articles relating to the topic. The label may include a title for the news collection. The label may include a hash tag applied to one or more social networking posts discussing the topic.

The disclosed subject matter also relates to a machine-readable medium including instructions stored therein, which when executed by a machine, cause the machine to perform operations. The operations may include retrieving terms associated with a content item set relating to a topic, the content item set comprising content items, and the terms associated with the content items based on user queries. The operations may include selecting one or more terms from the terms based on ranking the terms according to one or more criteria. The operations may include generating a label from the selected one or more terms, and applying the label to a content item relating to the topic. Other aspects can be embodied in corresponding systems and apparatus, including computer program products.

These and other aspects can include one or more of the following features. The content item set may include a news collection including a plurality of news articles relating to the topic and the label comprises a title for the news collection. The label may include a hash tag applied to one or more posts discussing the topic.

These and other features of the invention described throughout the application provide one or more advantages, including but not limited to, generating a label for content items according to user query information, wherein the label provides the user with information regarding the content of the content items.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
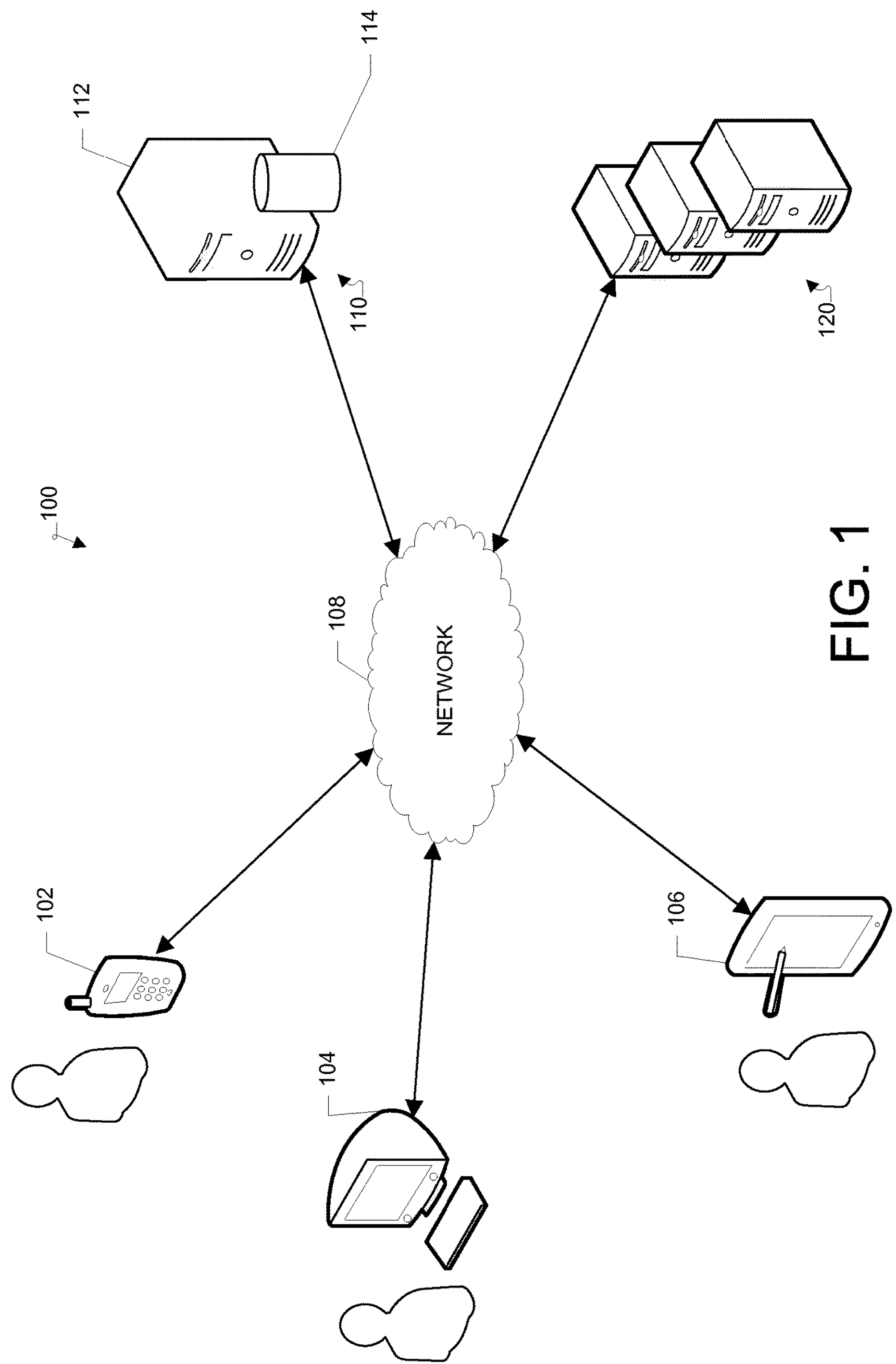
FIG. 1 illustrates an example client-server network environment, which provides for facilitating generating a label for content items according to user query information.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

A user of a client device may be provided with one or more content items. In one example, the content items may include content items relating to a topic (e.g., news stories or social networking posts relating to or discussing a specific event, topic or news story). It is useful for users viewing the content items to be able to quickly discern the topic related to the content items. The labels can further help in aggregating the content items around a certain topic. These labels may, for example, be provided with respect to news items. In one example, a single label may be selected for all news items around a specific event or topic. The label can provide an indication of the event or topic and help the user by providing further context about the news items and/or a summarization of the content items. Furthermore, the label can be used in generating a Uniform Resource Locator ("URL") for the news items as a collection, where the URL can be shared with other users. In one example, where news item collections are provided to the user, the label can serve as a title for the entire collection, including the one or more stories. The label may be generated independent of the title of the specific content items and can serve as a headline/title (e.g., for a collection of content items) that avoids the use of a particular content item headline/title. In one example, this may be useful in avoiding use of specific content item titles or headlines (e.g., to avoid ownership concerns).

Similarly, with respect to social posts around same or similar topics associated with a news story or event, labels (e.g., as hashtags) can be associated with the posts to provide a categorization of the posts. These labels can be effective in aggregating all of the social conversation around a news story or event and provide suggestions of labels (e.g., hashtags) that users themselves can adopt in their discussion about the event or news story.

The label may be generated using search terms and phrases used by users in a search query to locate content items associated with the topic (e.g., news story or event). In one example, content items associated with a specific topic may be identified based on various key terms or phrases that appear within the content item. When a user search query is issued, a set of content items may be presented to the user. The user may then select a content item or a collection of content items for consumption from the search results presented. The selection of a content item presented in response to the query causes an association to be made between the query terms and phrases and the content item. The content item may be itself associated with a topic. The associations of query terms or phrases are stored with respect to collections of content items relating to the same topic.

For each collection of content items relating to a specific topic, all query search terms and results are then retrieved and analyzed. The search terms and phrases may be ranked according to frequency of use, relevancy to the topic (e.g., event or news story) (e.g., number of content items that were viewed in response to the specific search term or phrase included in the query), or other criteria. In response to the analysis, a set of search terms or phrases may be selected (e.g., bigrams, trigrams, most common phrase or terms, most relevant phrase or terms).

In one example, the set of criteria may be used to score and rank the search terms or phrases, and the selection may be based on the ranking. The selected set of search terms and phrases are then processed (e.g., based on natural language rules, and/or label generation rules such as hashtag rules), to create a label that can be applied to content items relating to the topic (e.g., event or news story). For example, the label may act as a label or content indicator for individual content items, and/or content item collections. In some examples, the content items may include news story collections, and the label may serve as a collection title, and/or a URL link for sharing the collection. In another example, the label can be used as a categorization link for categorizing the content items. In one example, the label may comprise a hashtag applied to and/or recommended for application to social networking posts relating to the topic (e.g., event or news story).

FIG. 1 illustrates an example client-server network environment, which provides for facilitating generating a label for content items according to user query information. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate generating a label for contents items provided for display to a user interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various services including, for example, content item repositories, search engines, news services, and/or social networking services.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more services hosted by remote servers 120, through a client application installed at the electronic devices 102, 104, and 106. Alternatively, the user may interact with the system and/or services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
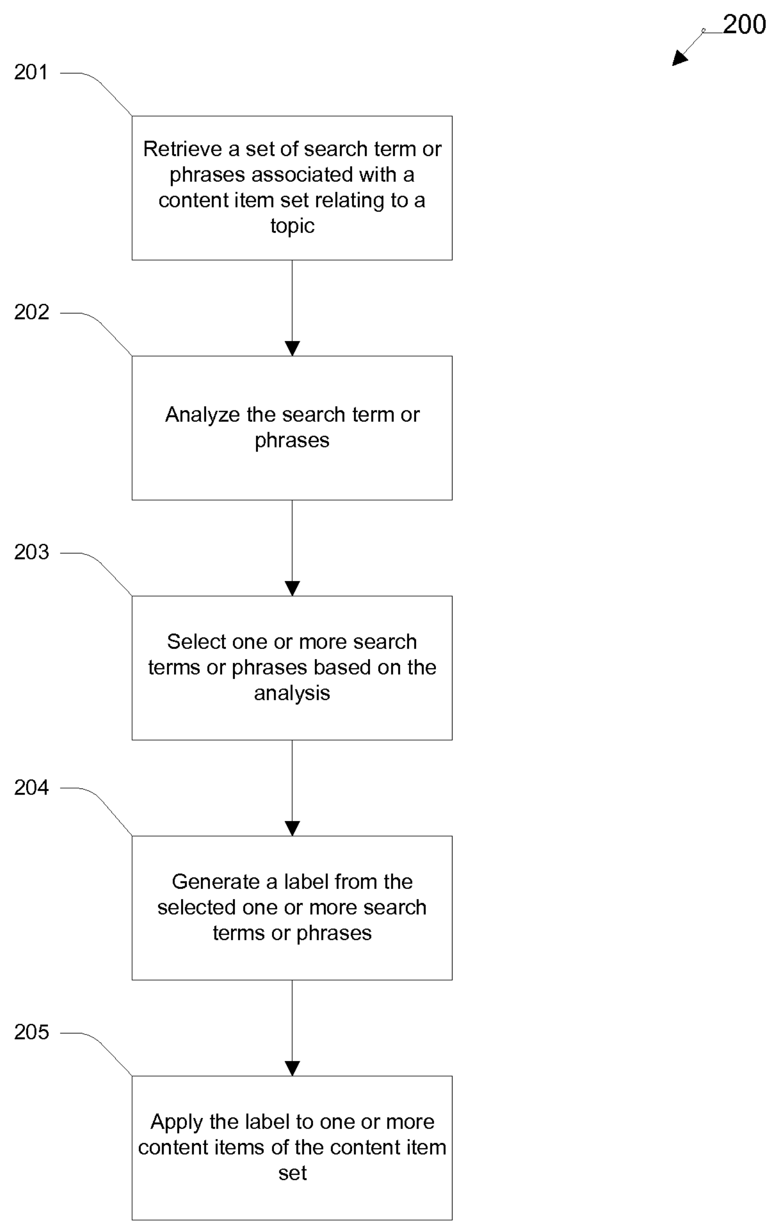
FIG. 2 illustrates a flow diagram of an example process for generating a label for content items according to user query information.

FIG. 2 illustrates a flow diagram of an example process 200 for generating a label for content items according to user query information. In step 201, a set of search terms or phrases associated with a topic are retrieved. In one example, the topic may correspond to an event or news story. In one example, the search term or phrases are identified based on search queries by one or more users that result in users viewing content items related to the topic. An example method for identifying search terms or phrases associated with a topic is described in further detail below with respect to FIG. 3.

In step 202, the retrieved search terms or phrases are analyzed. In one example, the search terms or phrases are scored and/or ranked according to various criteria. For example, in one implementation, the search terms and phrases are analyzed according to the frequency that the search term or phrase appears in a query that results in a content item associated with the topic being viewed, the total number of content items viewed in result of queries containing the search term or phrase, other search terms or phrases used in queries including the search term or phrase, and/or other similar criteria. In one example, a score may be calculated for each of the terms or phrases. In one example, the score may be adjusted, based on other terms or phrases within the queries containing the terms or phrases. In one example, the score may be a weighted score with some criteria having a higher weight than other criteria.

In step 203, one or more of the search terms or phrases are selected based on the analysis. In one example, the search terms or phrases may be selected according to a ranking or score calculated according to one or more of the criteria. In one example, the most common search terms or phrases may be selected. In another example, search terms or phrases may be selected based on the analysis and/or other considerations. For example, search terms or phrases may be selected by building bigrams, trigrams, or n-grams of terms or phrases and determining commonness of the search terms or phrases. The search terms or phrases may be selected by selecting related search terms or phrases (e.g., the search terms or phrases for making a label or title according to various rules of language or label generation rules).

In step 204, a label is generated from the selected one or more search terms or phrases. For example, the label may be generated by combining the selected search terms or phrases to form a title or descriptive phrase according to various label generation rules or rules of language. In one example, the search terms or phrases may be used to generate a hashtag. For example, a hashtag may be generated by selecting all of some of the selected terms or phrases and concatenating the terms or phrases to generate a hashtag.

In step 205, the generated label is applied to one or more content items associated with the topic. In one example, various content items may be associated with the topic according to various criteria, including the title of the content item, the content of the content item (e.g., words or phrases, and/or links to other content items included in the content item), or other indicators of the topic pertaining to the content item.

Figure 3:
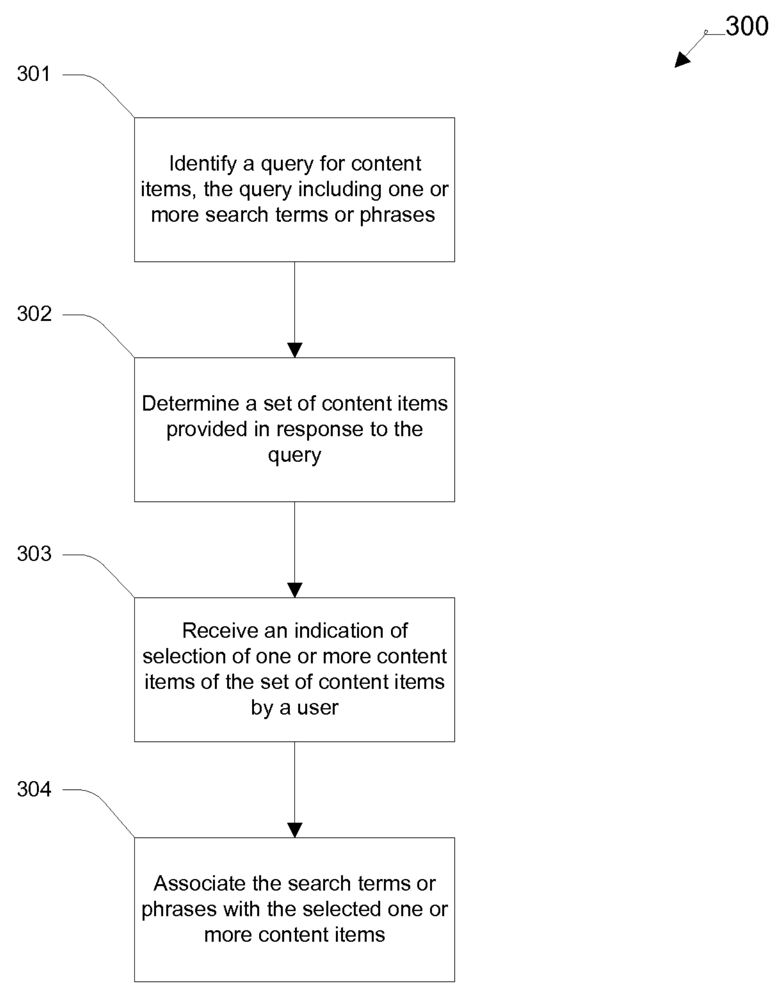
FIG. 3 illustrates a flow diagram of an example process for identifying search terms or phrases associated with one or more content items.

FIG. 3 illustrates a flow diagram of an example process 300 for identifying search terms or phrases associated with one or more content items. In step 301, a query for content items is identified. The query includes one or more search terms or phrases as search criteria. In one example, the search terms or phrases are provided by the user. In some examples, one or more of the search terms or phrases may be automatically selected in response to a query by the user.

In step 302, a set of content items provided in response to the query are determined. For example, the query may be a search request at a search engine. In one example, the search engine may include a vertical search engine (e.g., a search engine for providing content of a specific media type, such as news). In one example, in response to the query, one or more content items meeting the search criteria of the query are identified. In some examples, the content items identified may, for example, be selected based in part on the search terms or phrases associated with the query. The determined set of content items may include content items provided for display in response to the query.

In step 303, an indication of selection of one or more content items of the set of content items is received. For example, the set of content items may be provided for display to a user (e.g., as search results). The user may then select one or more of the displayed content items. In some examples, the selection by the user provides an indication that the content item is in fact responsive to and/or related to the search query and/or intent of the user. Thus, it is likely that the search terms or phrases associated with the query are related to selected one or more content items.

In step 304, the search terms or phrases associated with the query are associated with the one or more selected items. In one example, the association provides an indication that the terms or phrases are related to or indicative of the topic or content of the content. In one example, the content items may be associated with a topic or category. In such examples, the search terms or phrases are further associated with the topic or category and/or with other content items belonging to the same topic or category.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
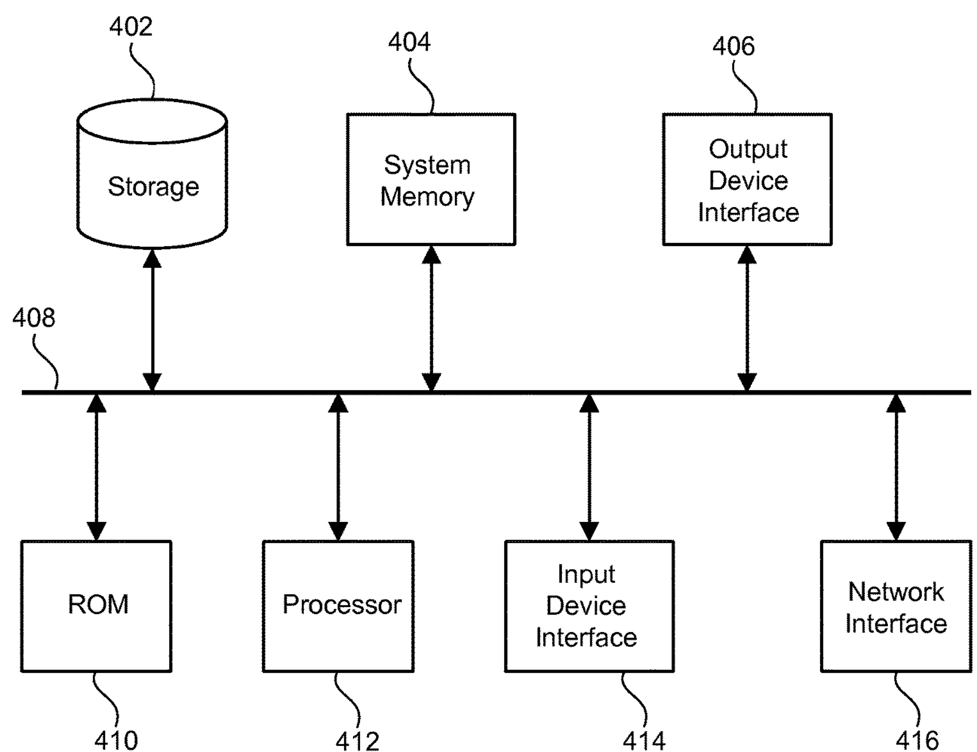
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for generating a label for content items according to user query information according to various implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touch-screen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean “one and only one” unless specifically so stated, but rather “one or more.” Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an “aspect” does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a “configuration” does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word “exemplary” is used herein to mean “serving as an example or illustration.” Any aspect or design described herein as “exemplary” is not necessarily to be construed as preferred or advantageous over other aspects or designs.

What is claimed is:

1. A machine-implemented method, comprising:

identifying content items provided in response to a query including a set of search terms associated with a topic;

receiving an indication of selection of at least one content item of the content items, wherein the selection of the at least one content item provides access to the at least one content item;

associating, in response to receiving the indication, the set of search terms of the query with the topic of the selected at least one content item;

analyzing the set of search terms based on the content items provided in response to the query as search results;

selecting one or more terms from the set of search terms based on the analysis;

generating a label from the selected one or more terms by restricting titles of the content items to be excluded from the label; and applying the label to the content items relating to the topic.

2. The method of claim 1, wherein analyzing the set of search terms comprises ranking the set of search terms according to one or more criteria, and wherein selecting the one or more terms is based on the ranking.

3. The method of claim 1, wherein analyzing the set of search terms comprises ranking each term of the set of search terms based on a frequency of use of the each term of the set of search terms with respect to the search results.

4. The method of claim 1, wherein analyzing the set of search terms comprises ranking the set of search terms based on relevancy of each term of the set of search terms to the topic.

5. The method of claim 1, wherein analyzing the set of search terms comprises analyzing other terms used in the query.

6. The method of claim 1, wherein the label comprises a title applied to a collection of content items relating to the topic.

7. The method of claim 1, wherein the label comprises a hashtag applied to one or more content items relating to the topic.

8. The method of claim 1, further comprising providing the label for display along with the content item relating to the topic.

9. A system comprising:

one or more processors; and a machine-readable medium comprising instructions stored therein, which when executed by the processors, cause the processors to perform operations comprising:

identifying content items provided in response to a query including a set of search terms associated with a topic;

receiving an indication of selection of at least one content item of the content items, wherein the selection of the at least one content item provides access to the at least one content item;

associating, in response to receiving the indication, the set of search terms of the query with the topic of the at least one content item;

analyzing the set of search terms based on a number of content items from the content items viewed as search results of the query;

selecting one or more terms from the set of search terms based on the analysis;

generating a label from the selected one or more terms by restricting titles of the content items to be excluded from the label; and applying the label to the content items relating to the topic.

10. The system of claim 9, wherein the topic comprises a news story or event.

11. The system of claim 9, wherein the content items comprise a news collection including a plurality of news articles relating to the topic.

12. The system of claim 11, wherein the label comprises a title for the news collection.

13. The system of claim 9, wherein the label comprises a hash tag applied to one or more social networking posts discussing the topic.

14. A non-transitory machine-readable medium comprising instructions stored therein, which when executed by a machine, cause the machine to perform operations comprising:

identifying content items provided in response to a query including a set of search terms associated with a topic;

receiving an indication of selection of at least one content item of the content items, wherein the selection of the at least one content item provides access to the at least one content item;

associating, in response to receiving the indication, the set of search terms of the query with the topic of the at least one content item;

selecting one or more terms from the set of search terms based on one or more criteria;

generating a label from the selected one or more terms by restricting titles of the content items to be excluded from the label; and applying the label to the content items relating to the topic.

15. The non-transitory machine-readable medium of claim 14, wherein the one or more criteria comprises determining commonness based on n-grams.

16. The non-transitory machine-readable medium of claim 14, wherein the content items comprise a news collection including news articles relating to the topic and the label comprises a title for the news collection.

17. The non-transitory machine-readable medium of claim 14, wherein the label comprises a hash tag applied to one or more posts discussing the topic.

* * * * *